US012684556B2

(12) United States Patent
Utkovski et al.

(10) Patent No.: US 12,684,556 B2
(45) Date of Patent: Jul. 14, 2026

(54) DEVICE, BASE STATION AND METHOD FOR OPERATING SAME

(71) Applicant: Fraunhofer-Gesellschaft zur Foerderung der angewandten Forschung e.V., Munich (DE)

(72) Inventors: Zoran Utkovski, Berlin (DE); Johannes Dommel, Berlin (DE); Thomas Haustein, Berlin (DE); Lars Thiele, Berlin (DE); Dennis Wieruch, Berlin (DE); Baris Goektepe, Berlin (DE); Thomas Schierl, Berlin (DE); Cornelius Hellge, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 813 days.

(21) Appl. No.: 17/970,252

(22) Filed: Oct. 20, 2022

(65) Prior Publication Data

US 2023/0189247 A1     Jun. 15, 2023

Related U.S. Application Data

(63) Continuation of application No. PCT/EP2021/060086, filed on Apr. 19, 2021.

(30) Foreign Application Priority Data

Apr. 21, 2020     (EP) ..................................... 20170696

(51) Int. Cl.
$H04W\ 72/121$     (2023.01)
$H04W\ 52/02$      (2009.01)
$H04W\ 52/36$      (2009.01)

(52) U.S. Cl.
CPC ..... $H04W\ 72/121$ (2013.01); $H04W\ 52/0219$ (2013.01); $H04W\ 52/367$ (2013.01)

(58) Field of Classification Search
CPC ..... H04W 72/12; H04W 72/121; H04W 4/38; H04W 4/40; H04W 52/0209–0219;
(Continued)

(56) References Cited

U.S. PATENT DOCUMENTS

2013/0286957 A1* 10/2013 Bucknell ................. H04W 4/70
                                                 370/329
2016/0007139 A1* 1/2016 MacKenzie ............. H04W 4/70
                                                 370/329
(Continued)

FOREIGN PATENT DOCUMENTS

KR       101138589 B1 * 5/2012          H04L 63/0428
KR    20170029342 A * 3/2017           H04L 67/12

OTHER PUBLICATIONS

Machine Translation of KR 20170029342 A, Mar. 15, 2017 (Year: 2017).*
(Continued)

*Primary Examiner* — Paul H. Masur
(74) *Attorney, Agent, or Firm* — Perkins Coie LLP; Michael A. Glenn

(57) ABSTRACT

Device node of a (cellular) communication system including a base station node and a group of nodes; wherein the device node is configured to determine a field parameter to obtain a field parameter value and to transmit the respective field parameter value to the base station node using type-based multiple access resources; wherein the device node is configured to receive from the base station node information and to enable a type-based multiple access resource communication in response to the information.

22 Claims, 9 Drawing Sheets

(58) Field of Classification Search

CPC ..... H04W 52/04; H04W 52/32; H04W 52/36; H04W 52/367; H04L 67/12

See application file for complete search history.

(56) References Cited

U.S. PATENT DOCUMENTS

2019/0132041 A1\*  5/2019  Takei ........................ H04B 7/10
2021/0051525 A1\*  2/2021  Cao ..................... H04W 72/542

OTHER PUBLICATIONS

Machine Translation of KR 101138589 B1, May 10, 2012 (Year: 2012).\*

Dommel, Johannes, et al., "Joint Source-Channel Coding and Bayesian Message Passing Detection for Grant-Free Radio Access in IOT", ICASSP 2020-2020 IEEE International Conference on Acoustics, Speech and Signal Processing (ICASSP), Barcelona, Spain, 2020, (https://ieeexplore.ieee.org/document/9053021), 5 pp.

Jeon, Hyoungsuk et al., "Channel-Aware Energy Efficient Transmission Strategies for Large Wireless Sensor Networks", IEEE Signal Processing Letters, IEEE Service Center, Piscataway, NJ, US, vol. 17, No. 7, XP011308499, 4 pp, Jul. 2010.

Jeon, Hyoungsuk, et al., "Secure Type-Based Multiple Access: Transmission Strategy and Analysis for Perfect Secrecy", Information Theory Workshop (ITW), 2010 IEEE, IEEE, Piscataway, NJ, USA, XP031769048, 5 pp, Sep. 30, 2010.

Mergen, Gokhan, et al., "[Uploaded in 3 parts] Type Based Estimation Over Multiaccess Channels", IEEE Transactions on Signal Processing, vol. 54, No. 2, 5 pp, Feb. 2006.

\* cited by examiner

1

17_1

15

10_1

17_2

10_2

DEVICE, BASE STATION AND METHOD FOR OPERATING SAME

CROSS-REFERENCES TO RELATED APPLICATIONS

This application is a continuation of copending International Application No. PCT/EP2021/060086, filed Apr. 19, 2021, which is incorporated herein by reference in its entirety, and additionally claims priority from European Application No. EP 20 170 696.7, filed Apr. 21, 2020, which is incorporated herein by reference in its entirety.

BACKGROUND OF THE INVENTION

Embodiments of the present invention refer to a device node configured to determine a field parameter and to a respective method for operating the device. Embodiments refer to a device node of a (cellular) communication system, wherein the device uses type-based multiple access resource communication. Another embodiment refers to a device node configured to adapt it's transmit power.

Another embodiment refers to a base station node and a corresponding method for operating the base station. Embodiments refer to base station node of a (cellular) communication system using type-based multiple access resources. Another embodiment refers to base station node of a (cellular) communication system enabling to adapt the transmit power of the devices. Further embodiments refer to an interface and to an estimator. In general, embodiment of the present invention are in the field of type-based multiple access communication technologies.

FIG. 1 is a schematic representation of an example of a terrestrial wireless network 100 including, as is shown in FIG. 1(a), a core network 102 and one or more radio access networks $RAN_1$, $RAN_2$, ... $RAN_K$. FIG. 1(b) is a schematic representation of an example of a radio access network RAND that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RAND may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network can be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). Note, the sidelink interface may a support 2-stage SCI. This refers to a first control region containing some parts of the SCI, and optionally, a second control region, which contains a second part of control information.

For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station gNB₁ to gNB₅, and a network of small cell base stations (not shown in FIG. 1), like femto or pico base stations. In addition to the above described terrestrial wireless network also non-terrestrial wireless communication networks (NTN) exist including spaceborne transceivers, like satel- lites, and/or airborne transceivers, like unmanned aircraft systems. The non-terrestrial wireless communication net- work or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5/PC3 interface or WiFi direct. UEs that communicate directly with each other over the sidelink may include vehicles communicating directly with other vehicles (V2V communication), vehicles communicating with other entities of the wireless commu- nication network (V2X communication), for example road- side units (RSUs), roadside entities, like traffic lights, traffic signs, or pedestrians. RSUs can have functionalities of BS or of UEs, depending on the specific network configuration. Other UEs may not be vehicular related UEs and may comprise any of the above-mentioned devices. Such devices may also communicate directly with each other (D2D com- munication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g. GSM, UMTS, LTE base sta- tions.

When considering two UEs directly communicating with each other over the sidelink, e.g. using the PC5/PC3 inter- face, one of the UEs may also be connected with a BS, and may relay information from the BS to the other UE via the sidelink interface and vice-versa. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless commu- nication network, or some or all of the UEs directly com- municating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configu- ration is also referred to as a mode 2 configuration in NR V2X or as a mode 4 configuration in LTE V2X. As men- tioned above, the scenario in FIG. 3 which is the out-of- coverage scenario does not necessarily mean that the respec- tive mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present. In addition, FIG. 3, schematically illustrates an out of coverage UE using a relay to communicate with the network. For example, the UE 210 may communicate over the sidelink with UE₁ which, in turn, may be connected to the gNB via the Uu interface. Thus, UE₁ may relay infor- mation between the gNB and the UE 210.

Although FIG. 2 and FIG. 3 illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In the above-described scenarios of vehicular user devices, UEs, a plurality of such user devices may form a user device group, also referred to simply as group, and the communication within the group or among the group mem- bers may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

In a wireless communication system as described above with reference to FIG. 1, FIG. 2 or FIG. 3, a UE may connect to the wireless communication system or network via one or more relay UEs, like IoT $108_3$ in FIG. 1 communicating with the $gNB_4$ via $UE_3$. For example, the UE connecting to the network or system via the relay UE, which is also referred to as the remote UE, may be a UE that when being activated or switched on or when entering the coverage of a gNB, for certain reasons, may not connect to the gNB, however, it may connect to a relay UE. For example, an out-of-coverage UE as described above with reference to FIG. 3 may nevertheless establish a connection to the wireless communication system or network via a relay UE, i.e., the out-of-coverage UE establishes a connection to the relay UE. The remote UE communicates with the relay UE via the sidelink interface, like the PC5 interface. In other words, the relay UE may be a 3GPP access point to which the remote UE connects by a direct link, and via which the remote UE may connect to the wireless communication network. In accordance with another scenario, the relay UE, to which the remote UE may connect by a direct link, may be an access point of an arbitrary network, i.e., the remote UE may connect to the wireless communication network by a direct link to a non-3GPP access point. The CN of the wireless communication system may be connected to the non-3GPP access point, e.g., by the Non-3GPP Inter-Working Function, N3IW.

However, in either case the remote UE, when connecting over the sidelink interface to the relay UE is not known at the core network of the wireless communication system which only sees the relay UE so that certain control operations may not be performed by the core network.

Also, for a communication over the sidelink interface certain provisioning parameters are needed at the UE so as to allow the UE to perform sidelink operations. However, in case such provisioning parameters are missing at the UE or are not valid, for example are out dated, the remote UE is not capable of performing a sidelink operation with the relay UE and, thereby, is not capable of establishing a communication to the wireless communication network or system via the relay UE.

It is noted that the information in the above section is only for enhancing the understanding of the background of the invention and therefore it may contain information that does not form conventional technology that is already known to a person of ordinary skill in the art.

SUMMARY

An embodiment may have a device node of a communication system comprising a base station node and a group of nodes; wherein the device node is configured to determine a field parameter to acquire a field parameter value and to transmit the respective field parameter value to the base station node using type-based multiple access resources; wherein the device node is configured to receive from the base station node information and to enable a type-based multiple access resource communication in response to the information.

Another embodiment may have a device node of a communication system comprising a base station node and a group of nodes; wherein the device is configured to determine a field parameter to acquire a field parameter value and to transmit the respective field parameter value to the base station using type-based multiple access resources; wherein the device node is configured to adapt the transmit power level.

Another embodiment may have a user equipment of IoT device forming a device node according to the invention.

Another embodiment may have a base station node of a communication system comprising a group of nodes, each node configured to determine a field parameter in order to acquire a field parameter value, wherein each node is configured to transmit the respective field parameter value to the base station node using type-based multiple access resources; wherein the base station node is configured to transmit an information to the group of nodes indicating the type-based multiple access resources.

Another embodiment may have an interface connected to the base station node according to the invention, wherein the interface defines a message set mapping preambles, data messages or message IDs to possible field parameter values.

Another embodiment may have an estimator connected to the base station node according to the invention and configured to determine a common field parameter out of the received field parameter values and/or based on a number of respective received preambles, data messages or message IDs corresponding to respective field parameter values.

Another embodiment may have a base station node of a communication system comprising a group of nodes, each node configured to determine the field parameter in order to acquire a field parameter value, wherein each node of the group of nodes is configured to transmit the respective field parameter value to the base station node using type-based multiple access resources; wherein the base station is configured to transmit a power information to the nodes out of the group, wherein the power information triggers the nodes of the group to adapt or reduce a respective transmit power dependent on the number of nodes within the group and/or to adapt or reduce a respective transmitting periodicity dependent on the number of nodes within the group, or wherein the power information triggers the nodes to switch between equal transmit power mode and adaptive transmit power mode, wherein the equal transmit power mode uses a transmit power which is substantially equal for all nodes of the group, wherein the adaptive transmit power mode adapts the transmit power, such that the received power at the base station node is substantially comparable for all nodes of the group.

Another embodiment may have a communication system comprising a base station node of a communication system comprising a group of nodes, each node configured to determine a field parameter in order to acquire a field parameter value, wherein each node is configured to transmit the respective field parameter value to the base station node using type-based multiple access resources; wherein the base station node is configured to transmit an information to the group of nodes indicating the type-based multiple access resources, and a device node or plurality of device nodes of a communication system comprising a base station node and a group of nodes; wherein the device node is configured to determine a field parameter to acquire a field parameter value and to transmit the respective field parameter value to the base station node using type-based multiple access resources; wherein the device node is configured to receive from the base station node information and to enable a type-based multiple access resource communication in response to the information.

Another embodiment may have a method for operating a communication system comprising a base station node and a group of nodes, each node configured to determine a field parameter in order to acquire a field parameter value, wherein each node is configured to transmit the respective field parameter value to the base station node using type-based multiple access resources; comprising: transmitting an information to the group of nodes indicating the type-based multiple access resources.

Another embodiment may have a method for operating a communication system comprising a base station node and a group of nodes, each node configured to determine a field parameter in order to acquire a field parameter value, wherein each node is configured to transmit the respective field parameter value to the base station node using type-based multiple access resources; comprising: transmitting a power information to the nodes out of the group, wherein the power information triggers the nodes of the group to adapt or reduce a respective transmit power dependent on the number of nodes within the group and/or to adapt or reduce a respective transmitting periodicity dependent on the number of nodes within the group, or wherein the power information triggers the nodes to switch between equal transmit power mode and adaptive transmit power mode, wherein the equal transmit power mode uses a transmit power which is substantially equal for all nodes of the group, wherein the adaptive transmit power mode adapts the transmit power, such that the received power at the base station node is substantially comparable for all nodes of the group.

Another embodiment may have a method for operating device node of a communication system comprising a base station node and a group of nodes; comprising: determining a field parameter to acquire a field parameter value and to transmit the respective field parameter value to the base station node using type-based multiple access resources; receiving from the base station node information and enabling a type-based multiple access resource communication in response to the information.

Another embodiment may have a method for operating a device node of a communication system comprising a base station node and a group of nodes; comprising: determining a field parameter to acquire a field parameter value and to transmit the respective field parameter value to the base station using type-based multiple access resources; adapting the transmit power level.

Another embodiment may have a non-transitory digital storage medium having a computer program stored thereon to perform the method for operating a communication system comprising a base station node and a group of nodes, each node configured to determine a field parameter in order to acquire a field parameter value, wherein each node is configured to transmit the respective field parameter value to the base station node using type-based multiple access resources; comprising: transmitting an information to the group of nodes indicating the type-based multiple access resources, when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

Below, embodiment of the present invention will subsequently be discussed, wherein the problem and some conventional technology will be discussed.

According to embodiments, an effective method for performing distributed interference in wireless communication networks where a plurality of devices like IoT devices or UEs, observing correlated measurements.

Embodiments described herein provide an effective method to perform distributed inference in wireless communication networks where a plurality of devices observing correlated measurements.

The scenario of interest considers a wireless (cellular) communication system, e.g. based on 5G, comprising a plurality of mobile terminals (UEs/Sensor Nodes/etc.) which communicate with a plurality of base-stations (gNB/Access Points/etc.) according to a cellular communication protocol.

We consider the specific case of estimation over MAC [1], i.e. we target to observe common field parameter by means of spatially distributed massive number of "sensor nodes" performing independent measurements of "correlated" physical events.

Examples include:
 1. Estimation of environment parameter (humidity, air pressure, temperature, etc.) by means of distributed sensor systems
 2. Estimation of mobility (acceleration/velocity/direction) of persons (machines/vehicles/robots) using a plurality of multiple accelerometer 3. Predictive maintenance in factory automation, where multiple sensors observing different parts of the production line.

4. Feedback

In state-of-the-art systems like 5G-NR/NB-IoT, a separate source—channel coding is employed, i.e. each sensor nodes encodes a local observation and transmits an individual message over the wireless medium using pre-assigned (orthogonal) resources. This however becomes inefficient and impractical of the number of devices is very high (in which case the cost of coordination/orthogonalization becomes prohibitively large).

Figures 1A, 1B:
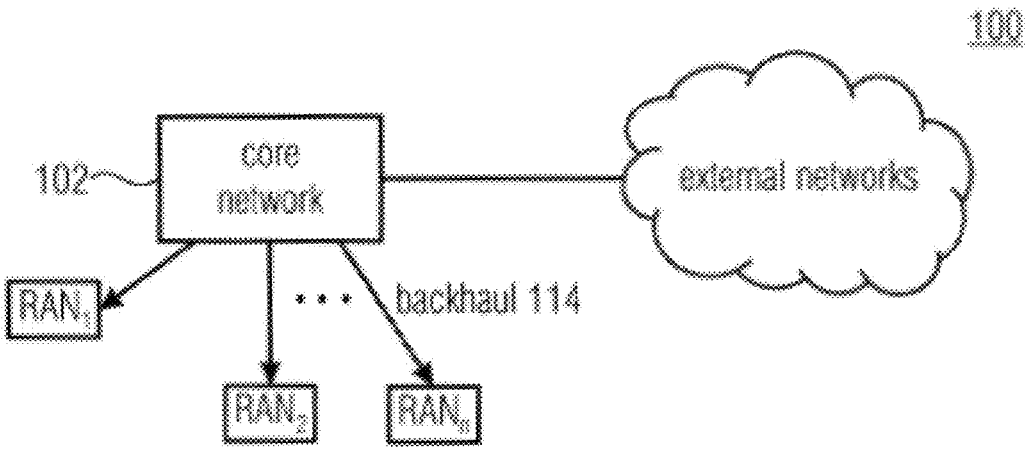
FIGS. 1a-b, 2 and 3 show schematic communication systems in the context of which the embodiments are used.
Figure 2:
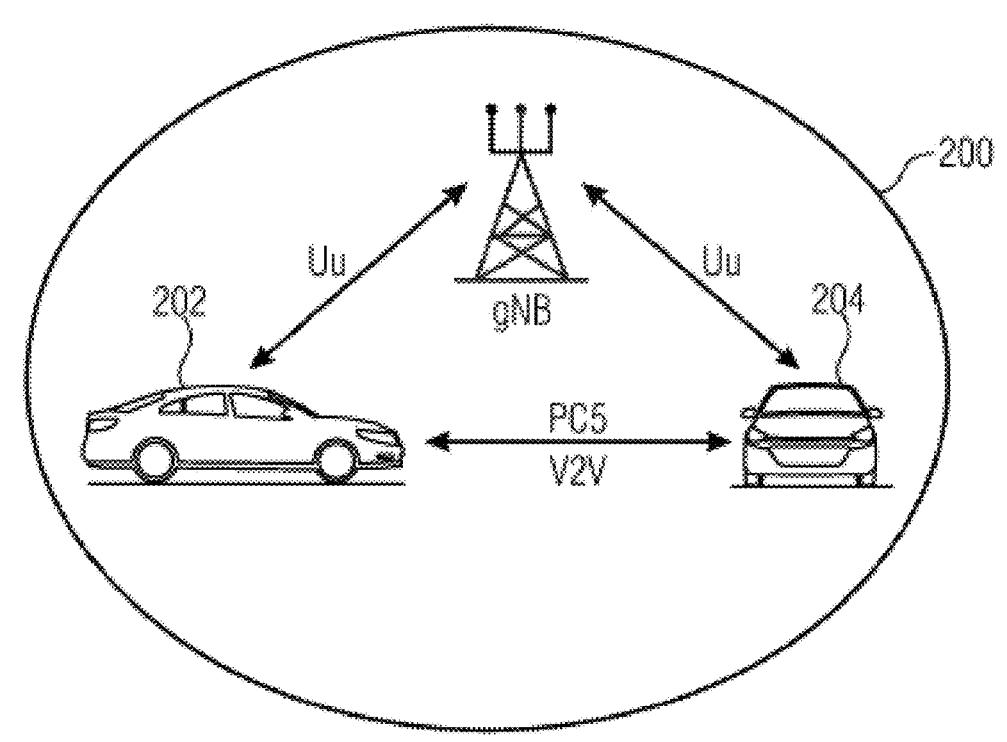
Figure 3:
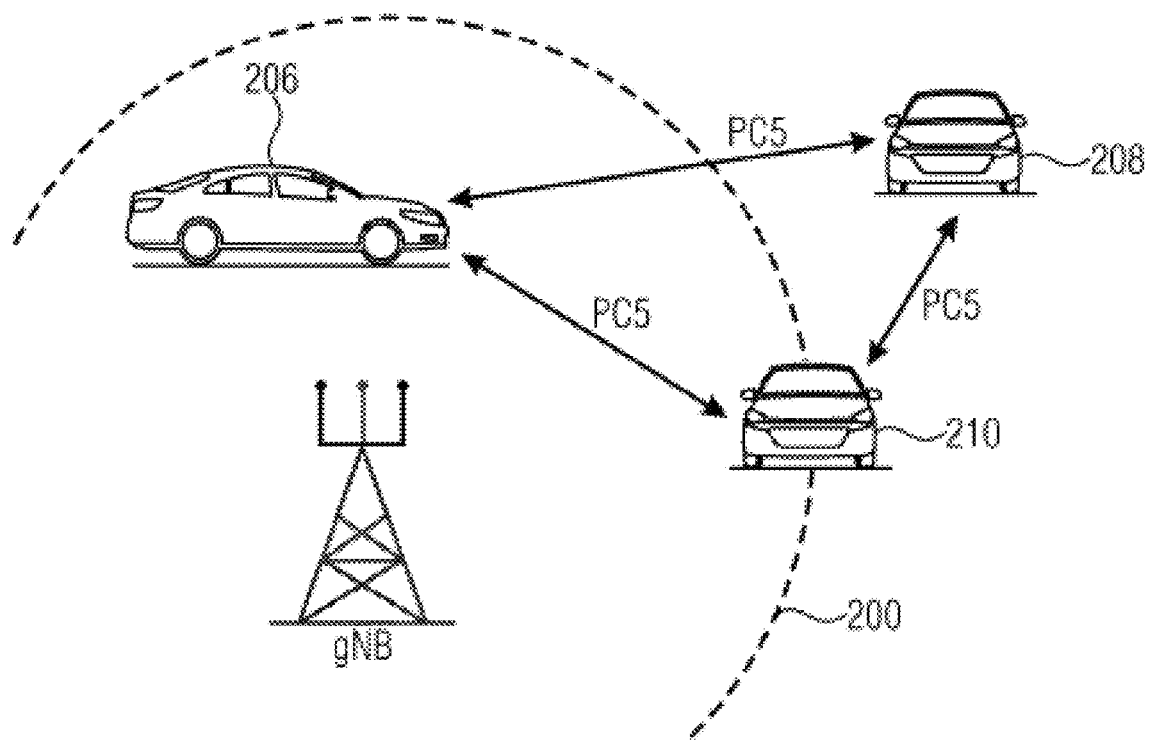
Figure 4:
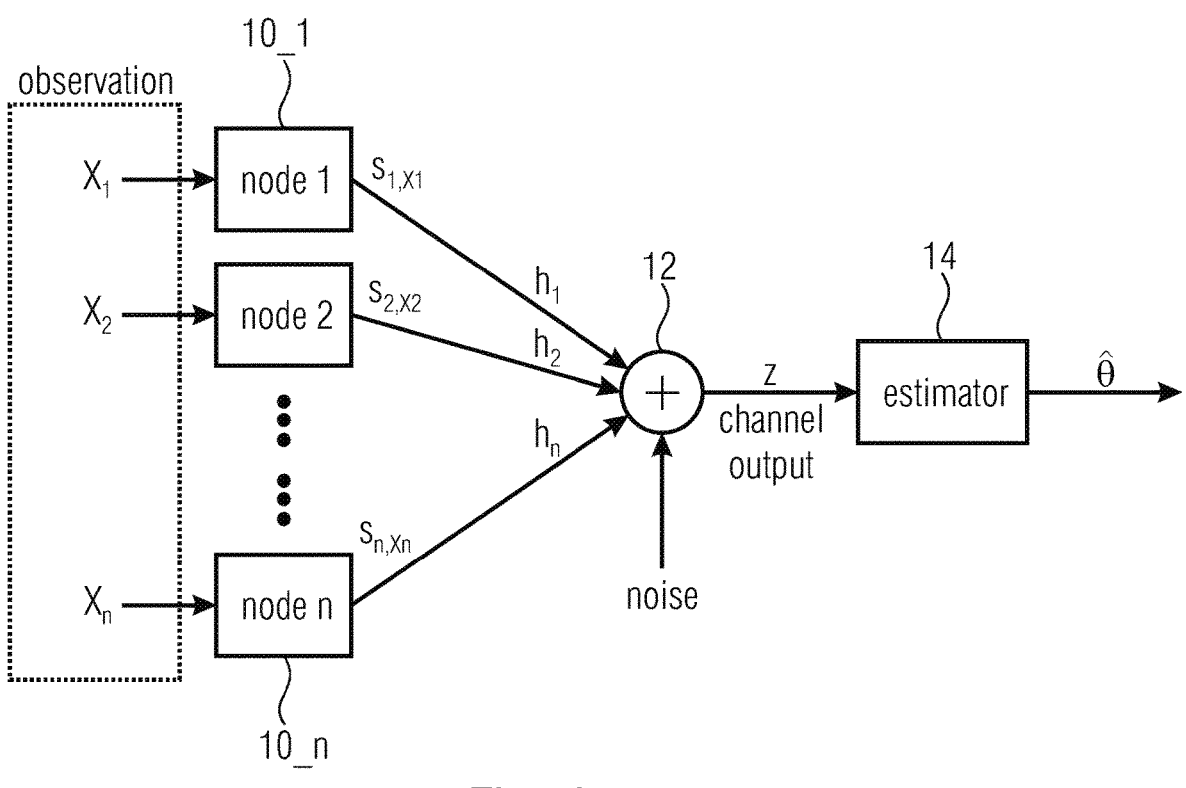
FIG. 4 shows a schematic representation illustrating the theoretically concept of type-based multiple access communication (TBMA, (1)) according to embodiments.

In contrast, our approach considers a joint source-channel coding with a TBMA-based identical mapping, i.e. all devices encode their measurements using identical codebooks. The theoretical principle of this scheme based on the observation that the estimator (i.e. the fusion center at the base station) does not need to know the raw data $X1, \ldots, Xn$ to achieve the best performance. Actually, if the nodes could deliver a sufficient statistic with their transmissions, then there is no loss of information. One such sufficient statistic is the empirical measure (i.e. the type). In FIG. 4, the theoretical concept of TBMA is depicted.

FIG. 4 shows the usage of n nodes which are marked by the reference numeral 10_1 to 10_n. each device 10_1 performs a respective observation, e.g., a measurement as illustrated by the raw data $X_1$ to $X_n$. The estimation over MAC does not require "raw data" $(X_1, \ldots, X_n)$—the empirical measurement, i.e., the type p, is sufficient.

$$\hat{p} = \frac{1}{n}(N_1, N_2, \ldots, N_R) \text{ where } N_j = \sum_{i=1}^{n} 1(X_i = j)$$

The TBMA [1] principle may be based on the following:
Let $u_1, \ldots, u_R$ be a set of orthonormal waveforms
Set $s_{i,X_i} = \sqrt{E}\, u_{X_i}$ $$y = \sum_{i=1}^{n} h_i \sqrt{E}\, u_{X_i} + W$$

$$\hat{p} \approx \frac{1}{\sqrt{E}\,n}[\langle y, u_1 \rangle, \langle y, u_2 \rangle, \ldots, \langle y, u_R \rangle]$$

Asymptotically optimal in the limit of large number of sensors (for $h_i = 1$)

These factors a typical, but not mandatory for TBMA. For example, although conventional type based multiple access resources are considered as being orthogonal resources, it should be noted that the it is also possible that the resource can differ from this conventional site. Consequently, non-orthogonal resources can also be used as TBMA resources or TMBA similar resources. Thus, non-orthogonal code words are also valid in accordance with this invention. Variations are, for example, described in Reference [2].

Expressed in other words this means that a concept, e.g. for a device node using the described/claimed mechanism, or a communicating using resources which are comparable to type based multiple access resources, but slightly vary, e.g. with respect to its orthogonality, fall also under the claimed approach. Thus, type based multiple access resource communication should be understood as communication using similar mechanisms than type based multiple access resource communication; type based multiple access resources should be understood as being similar or comparable to the type based multiple access resources.

The signals/signatures" $s_{i,X_i}$ from all nodes $(s_{i,X_i})$ are transmitted subject to the channel $h_1$ to $h_n$ and superimposed as illustrated by the sum element 12. This signal z is forwarded to the estimator 14 in order to determine the estimation data. Below, the operation of a cellular communication system using TBMA by means of shared information mapping/resource reuse will be discussed (cf. FIG. 6). Further, a specific power allocation-scheme which allows to extend the proposed communication will be discussed with respect to FIG. 7. The TBMA approach is illustrated by FIG. 5.

Figure 5:
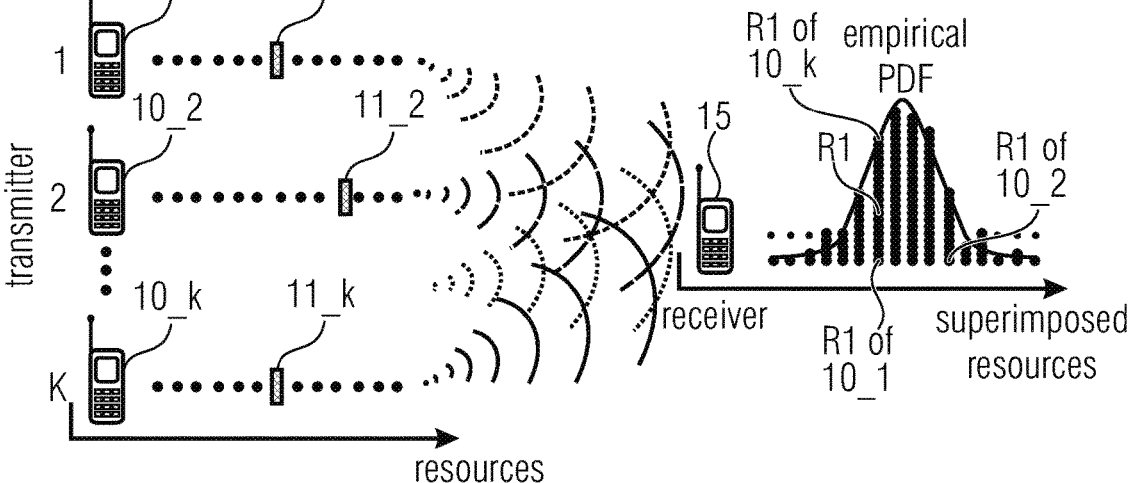
FIG. 5 illustrates schematically type-based multiple access with resulting empirical PDF using superimposed resources according to embodiments.

FIG. 5 shows a plurality of transmitter nodes 10_1 to 10_k, here UEs, which use the TBMA mode. They transmit the message to be transmitted by use of the signals 11_1 to 11_k. these signals allow 11_1 to 11_k are received by the receiver 15. The superimposed signals 11_1 to 11_k are determined. As can be seen, for the different messages, e.g., representing measurement values determined by the nodes 10_1 to 10_k are transmitted using different resources. For example, a transmitter 10_1 and 10_k determine a same value, so that the same resource R1 are used. This can also be seen with respect to the empirical PDF diagram within which the messages R1 of 10_1, R1 of 10_k and R2 of 10_2 are marked.

FIG. 5 depicts the general concept of type-based multiple access. A receiver wants to capture certain information (e.g. an event) from multiple sources. Therefore, each communication resource (e.g. subcarrier, sequence) is assigned to a dedicated message. The transmitter allocates the resources according to its desired message and transmits it (via wireless or wired channel).

If the messages are synchronously received, then the signals of each transmitter are superimposed. For the simple assumption that the signal energy on each resource are just accumulated and appropriately normalized, the receiver will observe an empirical PDF over the resources representing the summarized information of all transmitters.

In order to enable the above-discussed principle of using type-based resources the following principle of enabling the type-based communication may be applied, providing a method for distributed inference with Massive IoT using Identical Mappings. This concept is discussed with respect to FIG. 6.

Configuration of Individual Devices to Form a "Dedicated Observation Group" with Shared Set of Messages/Resources According to embodiments, the basic implementation provides a device node of a cellular communication system 1, which comprises at least a base station 15 and a group of nodes 10_1 to 10_n and 10_x. The device nodes 10_1 to 10_n are configured to determine a field parameter, e.g., a temperature, to determine a field parameter value (e.g., temperature value) and to transmit the respective field parameter value to the base station node 145 using type-based multiple access resources 17tp. According to embodiments, these resources may be part of the configured grants. The device node, e.g., 10_1, is configured to receive from the base station node 15 information and to enable the type-based multiple access resource communication in response to the received information.

Embodiment of the present invention are based on the principle that a device node, e.g., a UE or an IoT device is remotely enabled to activate the type-based communication/is triggered by this information as a kind of a wakeup signal. This has the benefit to enable low intensity application within short messages and to increase link-budget for satellite operation. Furthermore, it is beneficial, since spectral efficiency is increased since multiple devices share the same physical resources in a "non-orthogonal" fashion. This basic implementation will be discussed in detail taking reference to FIG. 6.

Figure 6:
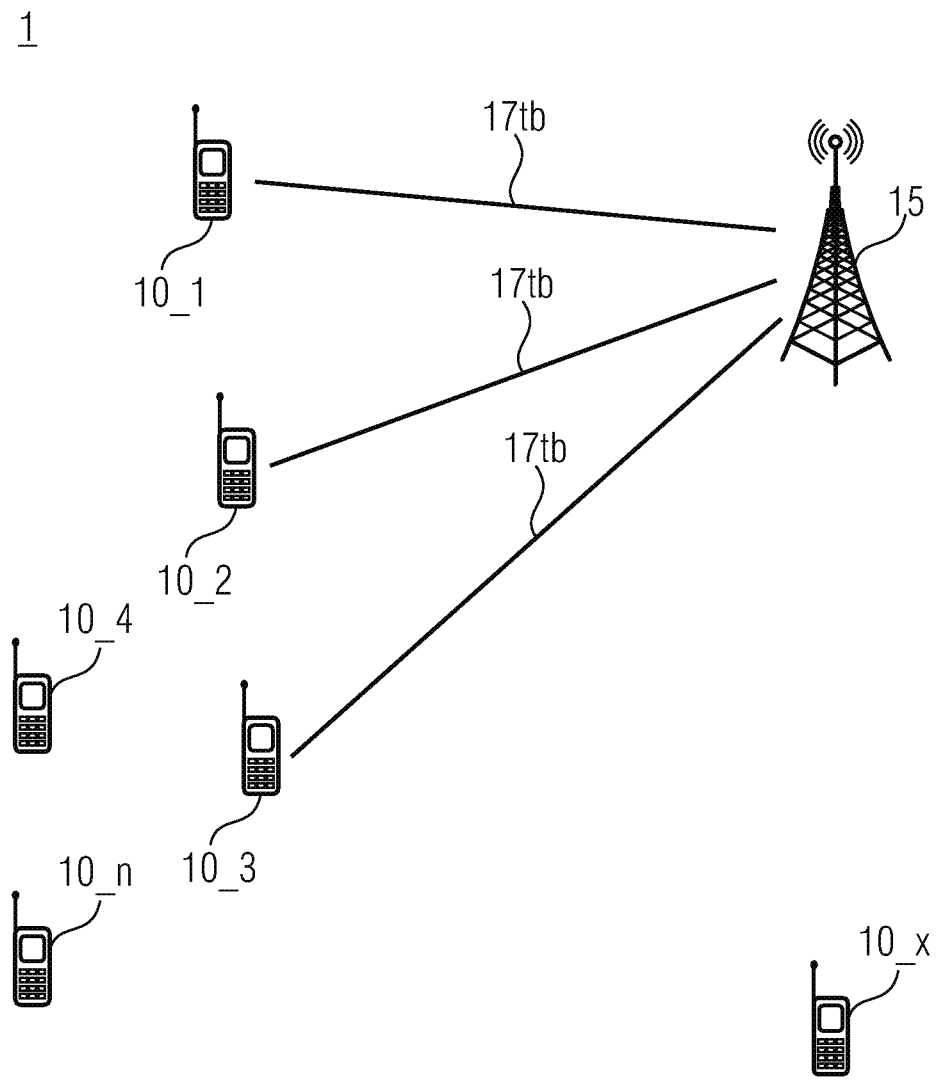
FIG. 6 shows a schematic configuration for a basis setup within which individual devices are configured to form a "dedicated observation group" with a shared set of messages/resources according to embodiments.

FIG. 6 shows a plurality of device nodes 10_1 to 10_*n* as well as another device node 10_*x*. All device nodes 10_1 to 10_*n* including 10_*x* can communicate with a base station node 15 of the shown communication system 1. This communication between the base station 15 and the device nodes 10_1 to 10_*n* of the respective observation group is marked as 17*tb*. The communication system 1 may, for example, be LTE/5G-NR. The nodes 10_1 to 10_*n*, e.g., IoT devices or UE devices should form an observation group using a type-based communication. In order to operate this observation group in the type-based manner, a principle to configure a dedicated set of nodes, here the set 10_1 to 10_*n* is used. For this specific resources, e.g., a specific bandwidth portion is granted to these nodes 10_1 to 10_*n*. The node 10_*x* which does not belong to the observation group does not get the grant for the resources. Furthermore, the observation group 10_1 to 10_*n* receives an information from the base station 15 indicating the resources to be used and that these resources should be used as type-based multiple access resources. The respective device nodes received from the base station 15 this information and enable the type-based multiple access resource communication in response to this information. For the device node, this means, for example, that the data type to be transmitted by the respective nodes 10_1 to 10_*n* are limited to type-based data in the indicated resources. This information is transmitted or broadcasted by base station, e.g., by use of configured grants. This means, for example, that the base station 15 transmits the information as part of the configured grant configuration. Alternatively, the base station may transmit the information by use of a group-common RNTI.

The above-discussion states that just certain devices, e.g., the devices arranged within a cell or subcell should form the observation group, wherein other devices, like the device 10_1 should be out of the device group. In order to determine the device group, the base station 15 may use beam forming to transmit the information triggering to switch into the type-based communication mode.

It is also possible that not all devices, e.g., the device 10_4 are not formed by UEs, but by more simple elements, like IoT devices. In this case, transmitting the triggering information as part of the configured grant configuration or something comparable is not the preferred variant. Here, this signal, e.g., a wakeup signal, can be broadcasted, so as to trigger the device node 10_4 to activate type-based multiple access resource communication. In this case, it is referred to as wakeup signal, since such simple LTE devices may, for example, just use the type-based multiple access resource communication mode.

The other devices 10_1 to 10_*n*, which are capable of using different nodes may be configured to inform the base station node on its capability for type-based multiple access resource communication.

Below, optional features according to embodiments will be discussed, first will focus on the general concept, then will focus on the device nodes 10_1 to 10_*n* and then with respect to the base station node 15.

According to embodiments, it is proposed to modify the Configured Grant feature from NR in that sense, that a group of UEs (each individually) is configured with the same special Configured Grant configuration, where the indication of the resources to be used are specified as "type-based access resource" in the respective configuration. This mechanism limits the scheduling freedom for the UE on this resources and ensures that only type-based data are allowed to be transmitted on this specific resources. Optionally these special configured grants are also tied to a special message set.

As already mentioned, some sensors may—according to embodiments—not be capable of actually "connecting" to the network, hence, the type-based access parameters are broadcasted in the system parameters (e.g. in SIB/MIB).

Hence, the network of the base station 15 broadcasts relevant parameters to the UEs 10_1 to 10_*n*, which are interesting in performing type-based access. The information may, for example, comprise:

Time/frequency resource/periodicity;

Number of message IDs;

Base sequence to be used;

A set of Message IDs to use;

"timing advance" for the "group".

Alternatively, power parameters, e.g., the TX power for the PUSCH (see 38.312 p. 14) may be transmitted. This information enables to use a specific power allocation scheme which will be discussed with respect to FIG. 7.

According to embodiments, the UEs 10_1 to 10_*n* may be configured with a group-common RNTI by the gNB to receive a group-common control message in the GC-PDCCH. This control message may modify the parameters described in section B, e.g. a new power level, a new resource to use, etc. Furthermore, the Transmit Power Control (TPC) field may be used to achieve a finer adjustment of the transmit power levels (cf. embodiments of FIG. 7).

Further embodiments provide conditional TBMA CGs: Furthermore, the gNB may configure the UEs with a trigger for a TBMA CG resource, e.g. a wake-up signal. The TBMA UEs would use the specific CG only in case the trigger is detected otherwise the TBMA UEs would not transmit on this specific CG configuration. This concept improves the power efficiency of the devices.

According to embodiments the conditional granted resource for group can be activated by eNB, i.e. wake-up signal. For example, the eNB requests Zip code from all UEs which have sent the message (fire) in the first place.)

a. Can be configured on application layer b. Configured grant only to be used by pre-configured messages (def. by application)

Further embodiments provide large area TBMA: Multiple gNBs may align on the used TBMA parameters, e.g. time-frequency resources, sequences, messages, etc., to perform an aligned TBMA operation, e.g. using the Xn interface. This allows that individual gNBs receive a different distribution of the messages which in turn allows them to coarsely localize certain messages (cf. embodiment of FIGS. 8*a* and *b*)

According to embodiments, a new UE class and signaling is defined, i.e., UEs indicating to the network being capable of performing type-based access.

According to embodiments, the base station communicates with the group of nodes by use of configured grants; here, the base station may transmit the information initiating TBMA as part of the configured grant configuration; alternatively the base station transmits said information by use of a group-common RNTI.

According to embodiments, by use of said information the data type to be transmitted by the nodes is limited to type-based data in the indicated resources. This limitation means for example that data to be transmitted are transmitted using a predefined/known/to be defined, but limited massage set: According to embodiments, said information comprises a message set mapping possible field parameter values to respective preambles, respective message IDs and/or respective data messages; alternatively the device node comprises a fixed or configured or preconfigured message set mapping possible field parameter values to respective preambles, respective message IDs and/or respective data messages. Consequently, the device node is—according to embodiments—preconfigured and/or configured to transmit the respective field parameter value using preambles, data messages or message IDs mappable to respective field parameter values and/or wherein the preambles, the data messages or the message IDs are shared with another node transmitting the same field parameter value. From another point of view this means that according to embodiments different field parameter values are transmitted using different message set mapping preambles, data messages or message IDs and/or via the same physical channel. Therefore, a message set defines an assignment of respective field parameter values to respective preambles, data messages or message IDs according to further embodiments.

According to embodiments, the device node is preconfigured and/or configured to inform the base station node on its capability for type-based multiple access resource communication.

According to embodiments, the device node is configured to receive a transmitted or broadcasted (wake-up) signal so as to trigger the device node or the nodes of the group to activate type-based multiple access resource communication and/or to activate type-based multiple access resource communication as response to a transmitted or broadcasted (wake-up) signal.

Another embodiment provides a base station node of a cellular communication system, wherein the base station node is configured to transmit an information to the group of nodes indicating the type-based multiple access resources.

According to embodiments, the base station communicates with the group of nodes by use of configured grants; for example, the base station transmits the information by use of a configured grant configuration or as part of the configured grant configuration; alternatively, the base station transmits the information by use of a group-common RNTI. This approach can beneficially used for devices, e.g. UEs, using the respective communication standard.

According to an embodiment, the UEs may be configured with a group-common RNTI by the gNB to receive a group-common control message in the GC-PDCCH. This control message may modify the parameters described in section B, e.g. a new power level, a new resource to use, etc. Furthermore, the Transmit Power Control (TPC) field may be used to achieve a finer adjustment of the transmit power levels.

According to embodiments, by use of the information the data type to be transmitted by the nodes is limited to type-based data in the indicated type-based multiple access resources.

According to embodiments, the base station node is configured to provide for all nodes of the group the same type-based multiple access resources or to provide for all nodes of the group the same type-based multiple access resources, such that same use the same resources, the same preamble and/or the same message ID for transmitting the respective field parameter value.

According to embodiments, the base station node is configured to transmit an information on one parameter out of the group comprising one or more of the following:

Time/frequency resources

Periodicity

Number of message IDs

Base sequence to be used

A set of message IDs to use

Timing advance

Power parameter

Transmit power to be used.

According to embodiments, the base station is configured to broadcast the information on the type-based multiple access resources, in the SIB and/or MIB. This approach can beneficially used for devices, like simple IoT devices, not using the respective communication standard.

According to embodiments, the base station node is configured to transmit the information by use of a beam which is directed to the selected group of nodes out of the plurality of nodes.

Another embodiment provides an interface connected to the base station node, wherein the interface defines a message set mapping preamble, data messages or message IDs to possible field parameter values. This message set is used by the respective devices to submit the respective parameter values.

Another embodiment provides an estimator connected to the base station node, which is configured to determine a common field parameter out of the received field parameter values and/or based on a number of respective received preambles, data messages or message IDs corresponding to the respective field parameter values.

Further embodiments provide corresponding methods. According to an embodiment, a method for operating a cellular communication system comprises the basic step of transmitting an information to the group of nodes indicating the type-based multiple access resources.

According to another embodiment, a method for operating one or more device nodes of a cellular communication system is provided. The method comprises the steps of determining a field parameter to obtain a field parameter value and to transmit the respective field parameter value to the base station node using type-based multiple access resources; and receiving from the base station node information and enabling a type-based multiple access resource communication in response to the information.

According to embodiments, these method steps may be performed by a computer. Thus, an embodiment provides a computer program for performing, when running a computer, the method.

Power Allocation-Scheme

Below and with respect to FIG. 7, another principle that is used in the context of type-based communication will be discussed.

According to an embodiment, a device node of a (cellular) communication system comprising a base station node and a group of nodes; wherein the device is configured to determine a field parameter to obtain a field parameter value and to transmit the respective field parameter value to the base station using type-based multiple access resources; wherein the device node is configured to adapt the transmit power level.

According to another embodiment, the device node is configured to switch between equal transmit power mode and adaptive transmit power mode. The equal transmit power mode uses a transmit power which is substantially equal for all nodes of the group; the adaptive transmit power mode adapts the transmit power, such that the received power at the base station node is substantially comparable for all nodes of the group; For example, the device node may be configured to adapt the transmit power level dependent on a measurement accuracy; alternatively the device node is configured to adapt or reduce the transmit power level per node dependent on a number of nodes within the group or dependent on an information indicative for the number of nodes received from the base station node and/or to reduce/adapt a transmitting periodicity depending on the number of nodes within the group or dependent on an information indicative for the number of nodes received from the base station node.

The above embodiments have the advantage that especially when considering IoT devices, the power consumption for these devices can be reduced, when reducing the transmit power. Another approach for reducing the transmit power is to just transmit the respective field parameter value when an incremental change occurs. Thus, the device is, according to further embodiments, configured to transmit the respective value just onto this condition. In this context, it should be noted that the base station can, according to embodiments, be configured to transmit an information on a transmit power to the group of nodes, wherein the transmit power is selected, such that a receive power at the base station node is substantially the same for all nodes of the group (beneficial for the transmit quality) or such that the transmit power used by all nodes of the group is substantially the same (beneficial for position determination).

Figure 7:
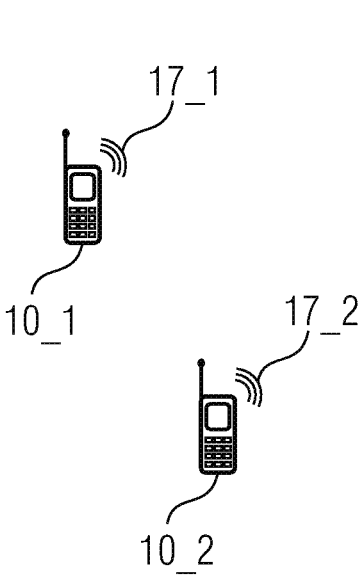
FIG. 7 schematically shows a communication system within which different transmitting power approaches can be used according to embodiments.

FIG. 7 shows a communication system 1 comprising the base station 15 and two exemplarily device nodes 10_1 and 10_2. Below, different approaches for controlling the transmit power of the device nodes 10_1 and 10_2 will be discussed. The imaged signal for the two devices nodes is marked by reference numeral 17_1 and 17_2. This signal uses type-based communication.

The general idea is that the UEs are selecting between two different types of transmit power:

same transmit power per UE (PC-M1) and same received power at serving gNB (PC-M2). In PC-M1 mode multiple gNBs may perform positioning procedures to determine the location of the message. Therefore, each UE 10_1 and 10_2 knows about a group-specific transmit power value.

In contrast, the PC-M2 is typical closed-loop power control scheme, see 38.331 p. 188. For PC-M1:

1. We can specify the TX power value for a group of UEs (MIB, SIB, higher layers, pre-configured) or
2. UE-wise using Alpha values (see 38.331, p. 188) to indicate whether the UEs have to perform open-loop power control (OLPC) or not using P_0 to indicate the basic power level
3. The gNB may configure a specific time/freq resource to switch to PC-M1, e.g. every 50 ms or every 5th radio frame or following a specific sequence to select PC-M1. Alternatively this may be triggered individually.

Generally speaking, this means that, according to embodiments, the device node is configured to switch between equal transmit power mode and adaptive transmit power mode, wherein the equal transmit power mode uses a transmit power which is substantially equal for all nodes of the group (fixed output Tx power control e.g. via group-common DCI). the adaptive transmit power mode adapts the transmit power, such that the received power at the base station node is substantially comparable for all nodes of the group (open/closed loop power control for serving BS). This enables beneficially to assign priority to sensors e.g. based on its distance to eNb.

According to further embodiments, the device node is configured to use different transmit power levels for different messages; alternatively the device node is configured to use different transmit power levels for different messages having different priorities. This means, according to embodiments, that the device node is configured to adapt the transmit power level dependent on a measurement accuracy; according to another embodiment the device node is configured to transmit together with the respective field parameter value a range illustrating the accuracy of the transmitted field parameter value. This enables beneficially to assign priority to sensors e.g. based on its quality of measurement.

Expressed in other words this means that it may according to embodiments be enabled to use unequal power allocation for different messages: The UEs may be configured with different power parameters for different messages or message priorities, such that more important messages are transmitted with an higher power level. This increases the reliability of the reception of these messages at the gNB.

According to another approach, the transmit power level is dependent on the number of nodes within the group. Here, according to embodiments, the device node is configured to adapt, e.g. to reduce the transmit power level not dependent on a number of nodes within the group. For this, the information regarding the number of nodes may be received from the base station 15. According to another variant, the transmitting periodicity may be adapted/reduced depending on the number of nodes of the group. This concept improves the scalability with growing number of devices.

These approaches have the purpose to enable seamless transition with growing (or general high) number of devices, the following solutions are proposed:

A) Access-Randomization: Select only a random part of sensors for transmission for energy saving Periodic: UE activation is determined by a configuration from base-station, e.g. by a specific periodicity or fraction of assigned pattern Event-triggered: only incremental changes are reported by UEs Option: If event trigger is active at UE. Than the UE may use "event-resource" for fast response and/or reconfigure periodicity-cycle according to configuration Option: IF BS detects "events". In this case the BS may send "wake-up" reconf.-signal to activate further configuration Below three further exemplarily concepts for power scaling will be discussed:

Option 1: "sum power limitation": when e.g. 100 nodes transmit, each device only needs $1/100$ of Tx power Option 2: "per device power limitation": use additional Tx power to increase link-budget (i.e. for satellite applications)

Option 3: Uneven power allocation (consider different power-level per signature. Alternatively, keep power per message from device constant or still decreasing with number of devices but still with an power increase. Potentially distribute power in messages uneven to compensate or exploit the gains of joint of different message parts. Furthermore to combat temporal channel fluctuations/jamming and exploit channel coding.

According to embodiments the number of active devices can be obtain as follows:

Option 1: Devices are attached to cell enabling a direct
determination of the number Option 2: Devices are not attached, but can listen to
broadcast channel.

Another embodiment provides a base station node of a
(cellular) communication system comprising a group of
nodes, each node configured to determine the field param-
eter in order to obtain a field parameter value, wherein each
node of the group of nodes is configured to transmit the
respective field parameter value to the base station node
using type-based multiple access resources; the base station
may be configured to transmit a power information to the
nodes out of the group; here, the power information triggers
the nodes of the group to adapt or reduce a respective
transmit power dependent on the number of nodes within the
group and/or to adapt or reduce a respective transmitting
periodicity dependent on the number of nodes within the
group; alternatively the power information triggers the
nodes to switch between equal transmit power mode and
adaptive transmit power mode, wherein the equal transmit
power mode uses a transmit power which is substantially
equal for all nodes of the group, wherein the adaptive
transmit power mode adapts the transmit power, such that
the received power at the base station node is substantially
comparable for all nodes of the group.

The above-discussed embodiment may be implemented
by a method. According to embodiments, a method for
operating a cellular communication system comprises the
following steps, transmitting a power information to the
nodes out of the group, wherein the power information
triggers the nodes of the group to adapt or reduce a respec-
tive transmit power dependent on the number of nodes
within the group and/or to adapt or reduce a respective
transmitting periodicity dependent on the number of nodes
within the group, or wherein the power information triggers
the nodes to switch between equal transmit power mode and
adaptive transmit power mode, wherein the equal transmit
power mode uses a transmit power which is substantially
equal for all nodes of the group, wherein the adaptive
transmit power mode adapts the transmit power, such that
the received power at the base station node is substantially
comparable for all nodes of the group.

According to another embodiment, a method for operat-
ing a device node may comprise the following steps, deter-
mining a field parameter to obtain a field parameter value
and to transmit the respective field parameter value to the
base station using type-based multiple access resources; and
adapting the transmit power level.

Position Determination—Intercell Interference Manage-
ment Btw. Multiple Cells

With respect to FIGS. 8a and 8b, a principle of position
determination will be discussed. As already mentioned
above, the transmitters can be configured, such that the
transmit signal has the same or comparable power level.
Here, comparable means that the parallel is substantially the
same, e.g., all transmitters output the same signal strengths
or signal strengths +/−20% or +/−3 db starting from the
average signal strengths of all transmitting nodes.

Figure 8A:
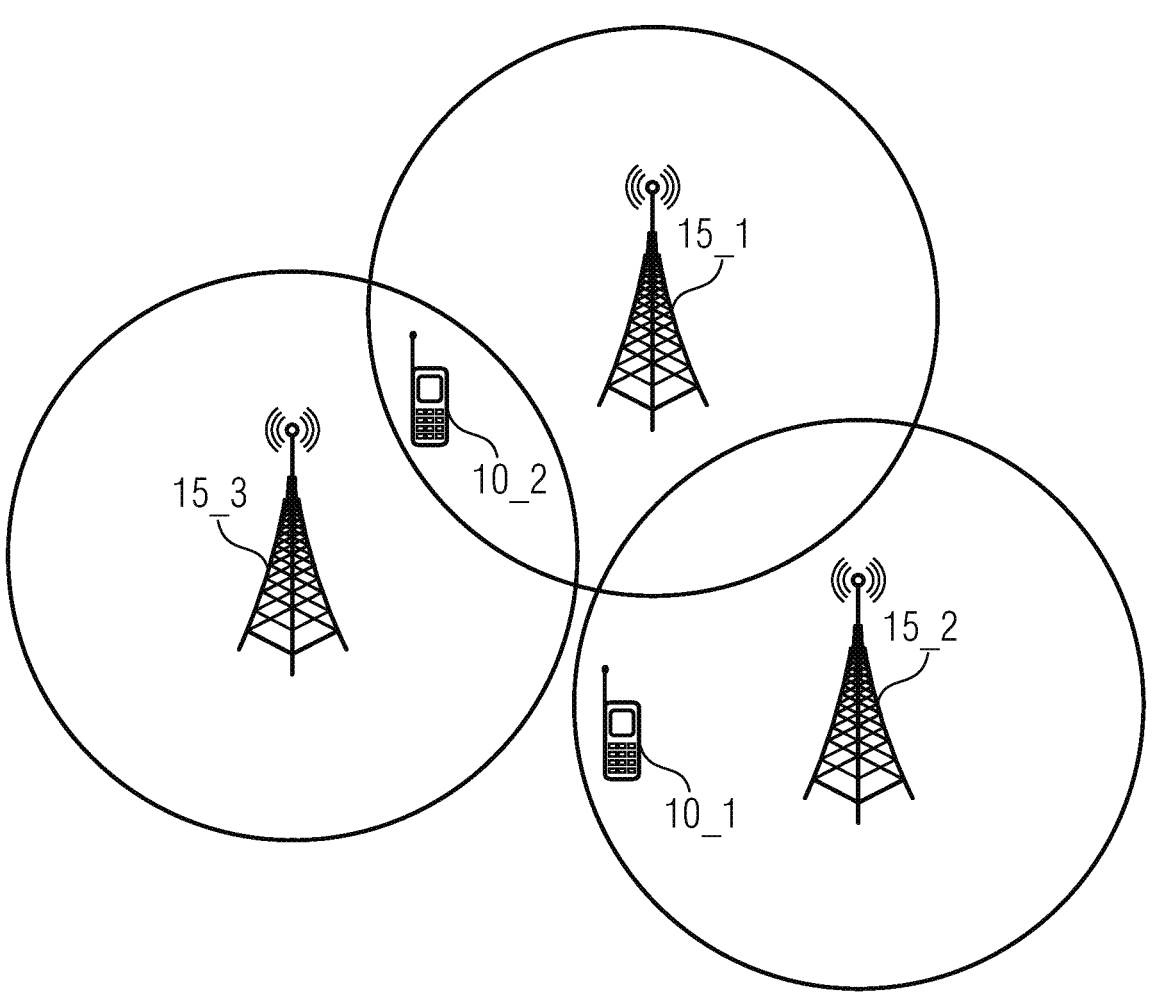
FIGS. 8a and 8b show schematically diagrams illustrating an approach for position determination of device nodes according to embodiments.
Figure 8B:
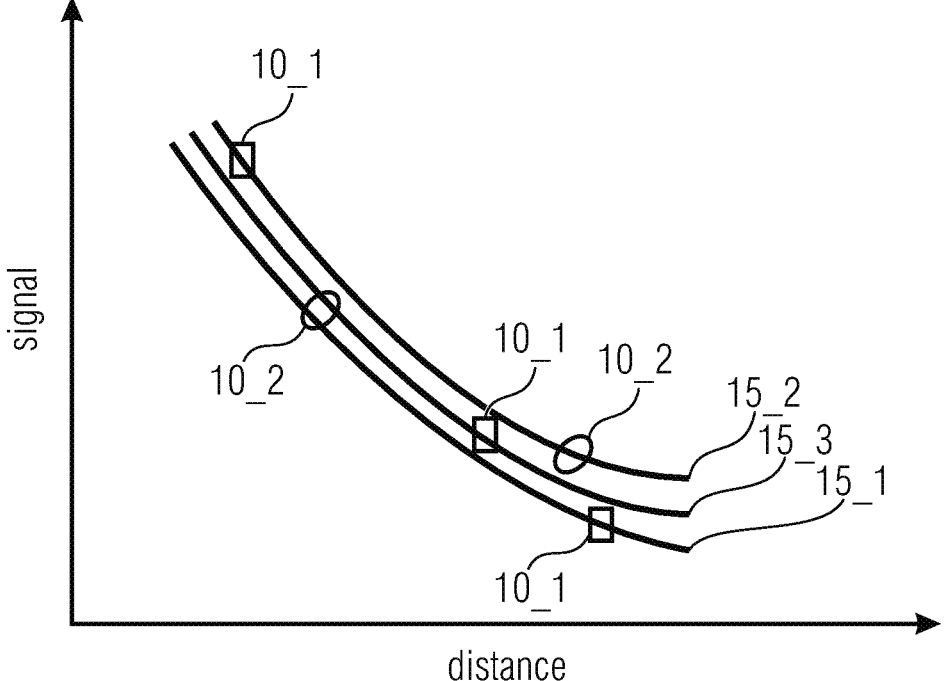

FIG. 8a shows three base stations 15_1, 15_2 and 15_3
together with the respective zones around the base station. A
mobile device 10_1 is arranged within a zone of the base
station 15_2. Another UE 10_2 is arranged between the two
base stations 15_1 and 15_3, e.g., equal distance to both.

Since both UEs 10_1 and 10_2 have a comparable trans-
mit signal, the signal strengths received at the base stations
15_1, 15_2 and 15_3 can be taken as a measure for the
distance. The dependency for all base stations 15_1, 15_2 and 15_3 are marked by the diagrams of FIG. 8b. FIG. 8b
has three curves (raylight distributions) for the three base
stations 15_1, 15_2 and 15_3, which are substantially the
same plotting the assumed signal strengths over the distance.
Note this rayleigh distribution is for example valid for
devices positioned on circle around eNb.

The resulting signal strengths and thus the resulting
distance for the two UEs 10_1 and 10_2 are indicated within
the diagram. As can be seen, the three distances differ when
seen from the difference base stations 15_1, 15_2 and 15_3.
By use of singularity and the knowing of the positions of the
base station 15_1 to 15_3, the position of the respective
transmitters 10_1 and 10_2 can be determined.

According to embodiments, it is thus possible to switch
the devices 10_1 and 10_2 into a position determination
mode within which the respective UEs use the same or
comparable signal strengths for the transmitting signal. This
signal strength can be controlled, as discussed above.

Since some UEs may be simple IoT devices, it is possible
that the signal base on which the position determination is
performed is a type-based multiple access signal. In order to
enable the other base stations 15_1 and 15_3 to receive the
signal, e.g., from the device 10_1 having a type-based
communication with the base station 15_2 belonging, the
base station 15_2 may be configured to share the type-based
multiple access resources with the two other base stations
15_1 and 15_3.

According to embodiments, the distance/position deter-
miner is configured to determine the position by use of a
further base station node receiving a communication signal
from the nodes of the group; and/or wherein the base station
node is configured to inform a further base station node
regarding type-based multiple access resources, so that the
further base station node is enabled to assist the distance/
position determiner determining the distance/position of the
nodes of the group.

According to embodiments, the base station node is
configured to inform a further base station node regarding
type-based multiple access resources. This enables resource
allocation/assignment for cellular operation All these embodiments may use the following principles
of intercell interference management between multiple cells.
Here, the network interface (X1) for intercell (cell less)
operation may be used. Identical/different resource assign-
ments of multiple cells may be applied. By doing this, a
primary (p-cell) and a secondary (s-cell) can be used to
configure grant resources.

According to embodiments, a so-called error resource
map for grant resources for the group may be used. Here, the
UE knows if use of grant resources or neighboring base
stations can be used (dual-connectivity for grant resources).
By use of this principle, the position determination can be
improved.

Figure 8C:
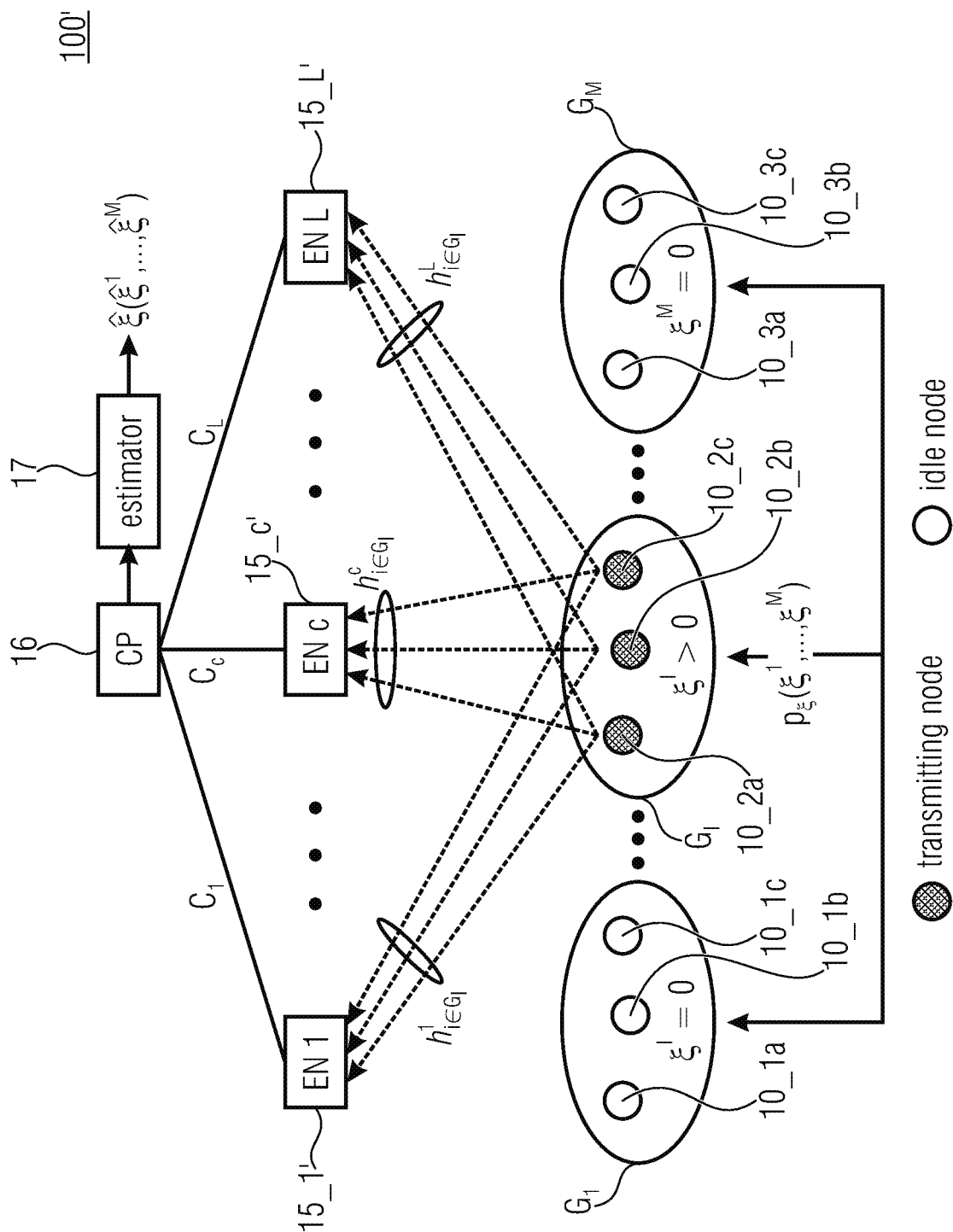
FIG. 8c shows schematically a communication network (e.g. Fog-RAN network) using the concept of forming a dedicated device group according to embodiments.

FIG. 8c shows an application of the above discussed
principle within a so-called Fog-RAN or cloud network 100
with three edge nodes 15_1', 15_c, and 15_l which are all
connected with a central processing entity 16'. The edge
nodes 15_1', 15_c' and 15_l enable a communication to the
device nodes which are marked 10_1a, 10_1b and 10_1c
belonging to group $G_1$, 10_2a, 10_2b and 10_2c belonging
to group $G_L$ and 10_3a, 10_3b and 10_3c belonging to group
$G_M$.

Here, the group $G_L$ comprising the device nodes 10_2a to
10_2c are transmitting nodes, wherein the respective signal
can be received by the three edge nodes 15_1', 15_c' and
15_l'. These received signals can be received, processed and
forwarded by the edge nodes 15_1', 15_c' and 15_l' to the central processing stage 16 and further to an estimator 17. Note, the forwarding can comprise a processing, e.g., by extracting the respective field parameter $C_1$, $G_C$ and $C_L$.

As discussed above, the device nodes, here, for example, the device nodes 10_2' to 10_c' may form a dedicated device group, e.g., an observation group via the above approach. This observation group is marked with the reference numeral $G_L$. When forming such an observation group, they transmit the respective field parameter $C_1$, $C_C$ and $C_L$ to the central processing unit 17, wherein they are now based on the field parameters $C_1$, $C_C$ and $C_L$ an estimation can be performed by the estimator 17.

Regarding the above-mentioned embodiments, it should be noted that the described solution can support (coherent as well as non-coherent) transmission. Thus, the following cases for signature design and synchronization are considered:

Fully unsynchronized using very long signatures (e.g., for satellite applications).

Tight synchronized for low latency application (i.e., motion tracking).

Coarse synchronized (Slot-wise sync if frame is not known).

As discussed above, the device nodes can, according to embodiments, be implemented as user equipment, like smart phones. Other possibilities will be discussed below. In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

When starting from sensors as devices, IoT devices, the above-described mechanisms using different transmit powers may be used for sidelink priority to the sensors, e.g., based on its quality of measurement or distance to the eNB. Thus, according to embodiments, sensors with more accurate info get higher priority: All sensors transmit with power depending on their priority (higher priority→larger power) or higher priority→higher probability (for randomization approach).

According to further embodiments, the sensors may directly transmit their assumed PDF of the locally acquired information (with according power normalization) This means, the accuracy is directly implemented by the transmitted signal of the sensor.

Note according to embodiments, sensors with larger distance to eNb are less important than closer ones: Priority is directly included by pathloss, however tuning priority may be more complicated.

In accordance with embodiments, the wireless communication system may include a terrestrial network, or a non-terrestrial network, or networks or segments of networks using as a receiver an airborne vehicle or a spaceborne vehicle, or a combination thereof.

The base station, BS, described herein may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Possible applications for the above-described embodiments are

Predictive maintenance in industrial wireless sensor networks (IWSN)

Motion tracking using wearable accelerometers in ER/VR

IoT based field parameter estimation (also for IoT over Satellite)

(CSI) feedback, e.g. for MIMO

Embodiments of the inventive approach are described for sidelink communications in the context of cellular communication systems, safety communication systems, campus networks. The present invention is not limited to this, rather, in accordance with further embodiments, the inventive approach may be employed in any kind of communication network, e.g. an ad-hoc communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 9:
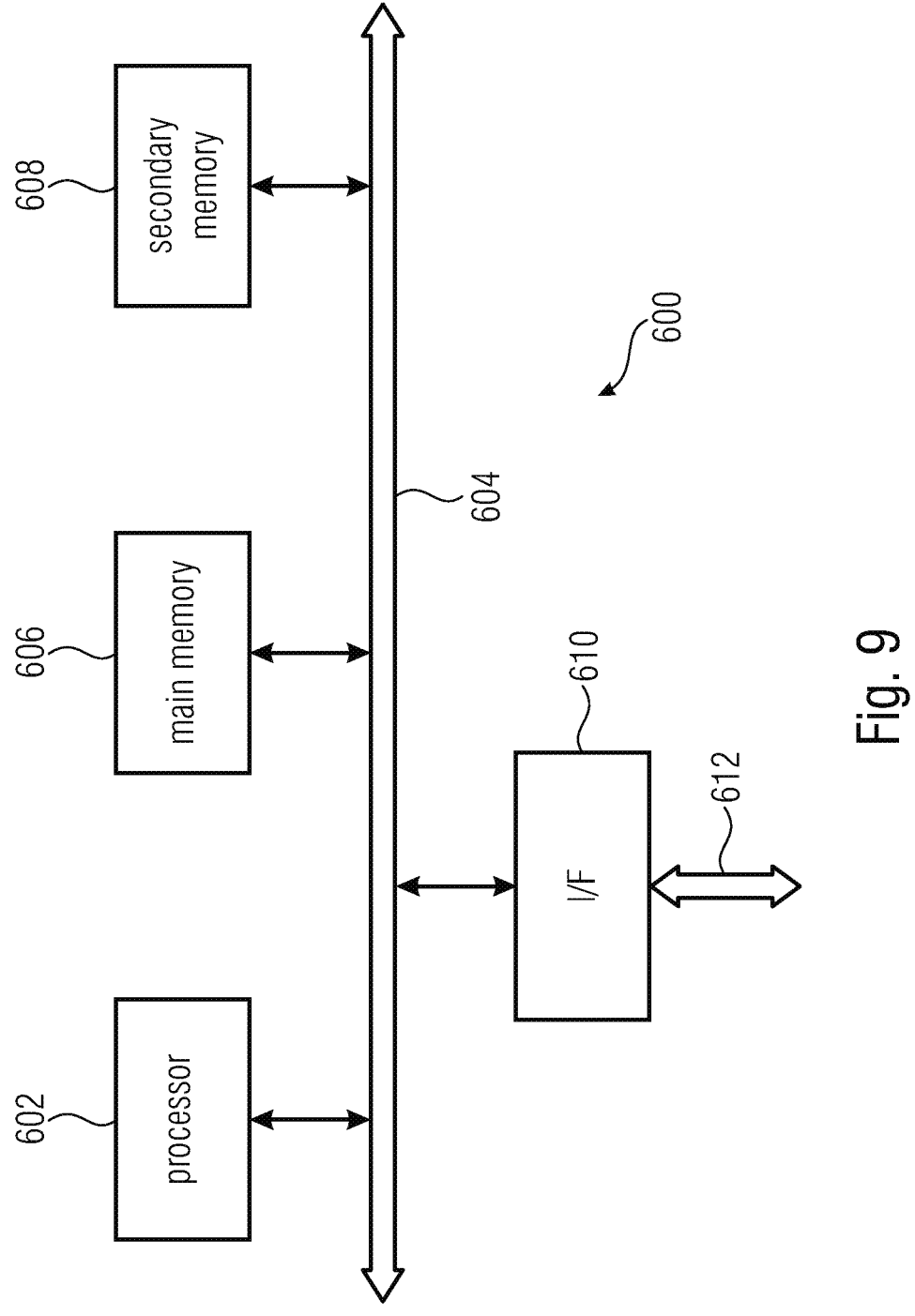
FIG. 9 shows a schematic software implementation of embodiments.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 9 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein.

The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

REFERENCES

[1] G. Mergen and L. Tong, "Type based estimation over multiaccess channels," in IEEE Transactions on Signal Processing, vol. 54, no. 2, pp. 613-626, February 2006.

[2] J. Dommel, Z. Utkovski, S. Stańczak and O. Simeone, "Joint Source-Channel Coding and Bayesian Message Passing Detection for Grant-Free Radio Access in IoT," ICASSP 2020-2020 IEEE International Conference on Acoustics, Speech and Signal Processing (ICASSP), Barcelona, Spain, 2020, pp. 8574-8578

| LIST OF ACRONYMS AND SYMBOLS | |
| --- | --- |
| TBMA | Type-based Multiple Access |
| ER/VR | Extended- & Virtual Reality |
| IWSN | Industrial Wireless Sensor Network |
| PDF | Power Spectral Density |

The invention claimed is:

1. A device node operated in a communication system comprising a base station node and a group of device nodes; the device node comprises a transceiver and a processing unit;

wherein the processing unit is configured to determine a field parameter to acquire a field parameter value and wherein the processing unit is configured to transmit the respective field parameter value to the base station node using type-based multiple access resources;

wherein the transceiver is configured to receive from the base station node information and to enable a type-based multiple access resource communication in response to the information;

wherein the transceiver is configured to receive a transmitted or broadcasted wake-up signal so as to trigger the device node or the nodes of the group to activate type-based multiple access resource communication; and/or to activate type-based multiple access resource communication as response to a transmitted or broadcasted wake-up signal.

2. The device node according to claim 1, wherein the base station communicates with the group of nodes by use of configured grants.

3. The device node according to claim 1, wherein at least one of the following applies:

by use of the information the data type to be transmitted by the nodes is limited to type-based data in indicated resources; or the information comprises a message set mapping possible field parameter values to respective preambles, respective message IDs and/or respective data messages; or the device node comprises a fixed or configured or preconfigured message set mapping possible field parameter values to respective preambles, respective message IDs and/or respective data messages.

4. The device node according to claim 1, wherein the processing unit is configured to activate type-based multiple access resource communication based on a signal received from the base station node or transmitted using configured grants; or wherein the transceiver is preconfigured and/or configured to transmit the respective field parameter value using preambles, data messages or message IDs mappable to respective field parameter values and/or wherein the preambles, the data messages or the message IDs are shared with another node transmitting the same field parameter value; or wherein the transceiver is preconfigured and/or configured to inform the base station node on its capability for type-based multiple access resource communication.

5. The device node according to claim 1, wherein a message set defines an assignment of respective field parameter values to respective preambles, data messages or message IDs; or wherein different field parameter values are transmitted using different message set mapping preambles, data messages or message IDs and/or via the same physical channel.

6. The device node according to claim 1, wherein the transceiver is configured to switch between equal transmit power mode and adaptive transmit power mode, wherein the equal transmit power mode uses a transmit power which is substantially equal for all nodes of the group, wherein the adaptive transmit power mode adapts the transmit power, such that the received power at the base station node is substantially comparable for all nodes of the group; or wherein the transceiver is configured to use different transmit power levels for different messages; and/or to use different transmit power levels for different messages comprising different priorities; or wherein the transceiver is configured to adapt the transmit power level dependent on a measurement accuracy; and/or wherein the transceiver is configured to transmit together with the respective field parameter value a range illustrating the accuracy of the transmitted field parameter value.

7. The device node according to claim 1, wherein the transceiver is configured to adapt or reduce the transmit power level per node dependent on a number of nodes within the group and/or to reduce/adapt a transmitting periodicity depending on the number of nodes within the group.

8. A user equipment, UE, of Internet of Things, IoT, device comprising a device node according to claim 1.

9. The device node according to claim 1, wherein the base station transmits the information as part of the configured grant configuration; and/or wherein the base station transmits the information by use of a group-common Radio Network Temporary Identifier, RNTI.

10. A device node of a communication system comprising a base station node and a group of nodes; the device node comprises a transceiver;

wherein the device is configured to determine a field parameter to acquire a field parameter value and to transmit the respective field parameter value to the base station using type-based multiple access resources;

wherein the transceiver is configured to adapt the transmit power level;

wherein the transceiver is configured to switch between equal transmit power mode and adaptive transmit power mode, wherein the equal transmit power mode uses a transmit power which is substantially equal for all nodes of the group, wherein the adaptive transmit power mode adapts the transmit power, such that the received power at the base station node is substantially comparable for all nodes of the group;

wherein the transceiver is configured to receive a transmitted or broadcasted wake-up signal so as to trigger the device node or the nodes of the group to activate type based multiple access resource communication; and/or to activate type-based multiple access resource communication as response to a transmitted or broadcasted wake-up signal.

11. The device node according to claim 10, wherein the transceiver is configured to adapt the transmit power level dependent on a measurement accuracy; or wherein the transceiver is configured to adapt or reduce the transmit power level per node dependent on a number of nodes within the group or dependent on an information indicative for the number of nodes received from the base station node and/or to reduce/adapt a transmitting periodicity depending on the number of nodes within the group or dependent on an information indicative for the number of nodes received from the base station node.

12. A base station node of a communication system comprising a group of device nodes, each device node comprises a transceiver and a processing unit, the processing unit being configured to determine a field parameter in order to acquire a field parameter value, wherein each transceiver is configured to transmit the respective field parameter value to the base station node using type-based multiple access resources;

wherein the base station node is configured to transmit an information to the group of nodes indicating the type-based multiple access resources;

wherein the transceiver of the device node is configured to receive a transmitted or broadcasted wake-up signal so as to trigger the device node or the nodes of the group to activate type-based multiple access resource communication; and/or to activate type-based multiple access resource communication as response to a transmitted or broadcasted wake-up signal.

13. The base station node according to claim 12, wherein the information is transmitted using one of the following:

configured grants; or configured grant configuration or as part of the configured grant configuration; or a group-common Radio Network Temporary Identifier, RNTI.

14. The base station node according to claim 12, wherein by use of the information the data type to be transmitted by the nodes is limited to type-based data in the indicated type-based multiple access resources.

15. The base station node according to claim 12, wherein the base station is configured to transmit an information on the transmit power to the group of nodes, wherein the transmit power is selected, such that a receive power at the base station node is substantially the same for all nodes of the group or such that the transmit power used by all nodes of the group is substantially the same.

16. The base station node according to claim 12, wherein the base station is configured to broadcast the information on the type-based multiple access resources, in the SystemInformationBlock, SIB and/or MasterInformationBlock, MIB; or wherein the base station node is configured to transmit the information by use of a beam which is directed to the selected group of nodes out of the plurality of nodes.

17. A communication system comprising a base station node according to claim 12 and a device node or plurality of device nodes according to claim 1.

18. A base station node of a communication system comprising a group of device nodes, each device node comprises a transceiver and a processing unit, the processing unit being configured to determine the field parameter in order to acquire a field parameter value, wherein each node of the group of nodes is configured to transmit the respective field parameter value to the base station node using type-based multiple access resources;

wherein the base station is configured to transmit a power information to the nodes out of the group, wherein the power information triggers the nodes of the group to adapt or reduce a respective transmit power dependent on the number of nodes within the group and/or to adapt or reduce a respective transmitting periodicity dependent on the number of nodes within the group, or wherein the power information triggers the nodes to switch between equal transmit power mode and adaptive transmit power mode, wherein the equal transmit power mode uses a transmit power which is substantially equal for all nodes of the group, wherein the adaptive transmit power mode adapts the transmit power, such that the received power at the base station node is substantially comparable for all nodes of the group;

wherein the transceiver of the device node is configured to receive a transmitted or broadcasted wake-up signal so as to trigger the device node or the nodes of the group to activate type-based multiple access resource communication; and/or to activate type-based multiple access resource communication as response to a transmitted or broadcasted wake-up signal.

19. A method for operating device node of a communication system comprising a base station node and a group of nodes; the method comprising:

determining a field parameter to acquire a field parameter value and to transmit the respective field parameter value to the base station node using type-based multiple access resources;

receiving a transmitted or broadcasted wake-up signal so as to trigger the device node or the nodes of the group to activate type-based multiple access resource communication; and/or activating type-based multiple access resource communication as response to a transmitted or broadcasted wake-up signal.

20. A non-transitory digital storage medium having a computer program stored thereon to perform the method for operating device node of a communication system comprising a base station node and a group of nodes; the method comprising:

determining a field parameter to acquire a field parameter value and to transmit the respective field parameter value to the base station node using type-based multiple access resources;

receiving a transmitted or broadcasted wake-up signal so as to trigger the device node or the nodes of the group to activate type-based multiple access resource communication; and/or activating type-based multiple access resource communication as response to a transmitted or broadcasted wake-up signal;

when said computer program is run by a computer.

21. A method for operating device node of a communication system comprising a base station node and a group of nodes: the method comprising:

determining a field parameter to acquire a field parameter value and to transmit the respective field parameter value to the base station using type-based multiple access resources;

adapting the transmit power level;

switching between equal transmit power mode and adaptive transmit power mode, wherein the equal transmit power mode uses a transmit power which is substantially equal for all nodes of the group, wherein the adaptive transmit power mode adapts the transmit power, such that the received power at the base station node is substantially comparable for all nodes of the group;

receiving a transmitted or broadcasted wake-up signal so as to trigger the device node or the nodes of the group to activate type-based multiple access resource communication; and/or activating type-based multiple access resource communication as response to a transmitted or broadcasted wake-up signal.

22. A non-transitory digital storage medium having a computer program stored thereon to perform the method for operating device node of a communication system comprising a base station node and a group of nodes; the method comprising:

determining a field parameter to acquire a field parameter value and to transmit the respective field parameter value to the base station using type-based multiple access resources;

adapting the transmit power level;

switching between equal transmit power mode and adaptive transmit power mode, wherein the equal transmit power mode uses a transmit power which is substantially equal for all nodes of the group, wherein the adaptive transmit power mode adapts the transmit power, such that the received power at the base station node is substantially comparable for all nodes of the group, receiving a transmitted or broadcasted wake-up signal so as to trigger the device node or the nodes of the group to activate type-based multiple access resource communication; and/or activating type-based multiple access resource communication as response to a transmitted or broadcasted wake-up signal;

when said computer program is run by a computer.

\* \* \* \* \*